United States Patent [19]
Kennedy

[11] 3,719,783
[45] March 6, 1973

[54] ACOUSTIC COUPLER

[76] Inventor: John P. Kennedy, 2198 Woodstock Road, Columbus, Ohio 43221

[22] Filed: April 23, 1971

[21] Appl. No.: 136,963

[52] U.S. Cl. ....................179/1 C
[51] Int. Cl. ....................H04m 11/00
[58] Field of Search ....................179/1 C, 2 C

[56] References Cited

UNITED STATES PATENTS

| | | | |
|---|---|---|---|
| 3,585,302 | 6/1971 | Swan | 179/1 C |
| 3,360,071 | 12/1967 | Vogelman | 179/1 C |

*Primary Examiner*—William C. Cooper
*Assistant Examiner*—Douglas W. Olms
*Attorney*—Cennamo, Kremblas and Foster

[57] ABSTRACT

A rubber-like housing for an acoustic coupler adapted to couple a telephone handset to a transducer for data communication. The configuration and material makeup of the housing insures intimate contact with the telephone handset. The upper portion of the housing is of rigid elastic material and somewhat elongated to completely secure the handset into a gripping position; whereas the lower portion of the housing is made up of relatively thin elastic material acting as a shock absorber. The upper and lower portion is separated by a continuous indentation. The durometer of the material and the indentation permits omnidirectional movement of the handset without affecting the coupling or its operation. A pair of such housings are oriented in an enclosure at an angle similar to the standard telephone to readily receive and immediately seal in position the telephone handset.

6 Claims, 8 Drawing Figures

INVENTOR
JOHN P. KENNEDY

BY

*Cennamo Kremblas & Foster*

ATTORNEYS

INVENTOR
JOHN P. KENNEDY
BY
Cennamo Kremblas & Foster
ATTORNEYS

ACOUSTIC COUPLER

BACKGROUND OF THE INVENTION

Computer availability has been very instrumental to an increased use. Interfacing equipment has realistically and practically brought the user to the computer for time-sharing use and the adaptability of the computer to present day needs. The most instrumental link between a user and a time-shared computer is the standard telephone and the telephone systems. Therefore, the need for concerted effort developmentwise has been in the interfacing equipment.

In the general class of interfacing equipment is the acoustic data coupler. A data coupler is a device that allows for the transmission and receipt of information from one point to another over ordinary telephone lines. The coupling equipment, apparatus and systems permit the digital signals from the subscriber's data terminal equipment, to be converted to audible frequency-shifted tones for transmission via the telephone lines. The tones when received by the distant telephone instrument are reconverted into their digital equivalents as required by the data terminal equipment.

A data coupler is the same as a "modem" — derived from the combination of the words "modulate" and "-demodulate". Modulation and demodulation take place in all data couplers.

There are two different types of data couplers in commercial use — "acoustic" and "direct access". The acoustic type of coupler utilizes the telephone handset at all times and generally is used only at the lower data rates below 300 baud. At the higher data rates the poor frequency response of the microphones in the telephone handset, i.e., its inability to reproduce the high baud rates, restricts the use of acoustic couplers.

Of primary significance, in the restricted use of the acoustic coupler at higher baud rates in contrast is the direct access coupler has excellent transient and frequency response, reasonably good sinusoidal output waveforms, minimum phase shift, minimum harmonic distortion, minimum loss of amplitude, and is relatively free from ambient noise.

To eliminate ambient noise in the conventional acoustic coupler, it had to be in intimate acoustic contact with the handset with no air leakage. As mentioned above, the standard telephone is used; however, the standard telephone is really not so standard — there are many variations, sizes and configurations. Ideally then, a coupler must be universally adaptable to all telephones to maintain the aforementioned intimate acoustic contact.

It also has been found that all structures have a resonant frequency of vibration and in many instances the couplers have a resonant frequency of vibration at or near the frequency of the originate or answer frequencies. The resonant vibrations when they do occur provide an intolerable amount of problems.

The prior art standard telephone type of coupler simply has not resolved its adaptability problems. Their use continues to be restricted.

SUMMARY OF THE INVENTION

The present invention is for an acoustic coupler and particularly to the coupler per se. The coupler is a rubber-like round-opening housing have a configuration and physical makeup to readily receive and immediately seal in position the telephone. The configuration comprises an elongated upper section of relatively rigid material to hold and secure the telephone. The lower portion of the coupler is separated from the upper portion by a continuous indentation. This is to purposely permit omnidirectional rocking of the upper portion relative to the lower portion. To further assist the rocking and to assure that the telephone can be seated- irrespective of what direction that give is necessary, the lower portion is of a relatively and readily pliable rubber-like material.

OBJECTS

It is a primary object of the present invention to provide a new and improved acoustic coupler adaptable for use with all standard telephones.

Another object of the present invention is to provide an acoustic coupler that has no or only a minimum of leakage and to thereby eliminate ambient noise and minimize or remove the other known problems encountered with acoustic couplers.

Another object of the present invention is to provide an acoustic coupler that permits omnidirectional movement therefore eliminating shock.

Another object of the present invention is to provide an acoustic coupler that is adaptable to receive the various standard telephone handsets and to firmly grip the same into position.

Further objects and features of the invention will become apparent when taken in conjunction with the drawings, in which:

DESCRIPTION OF THE PREFERRED EMBODIMENTS

Figure 1:
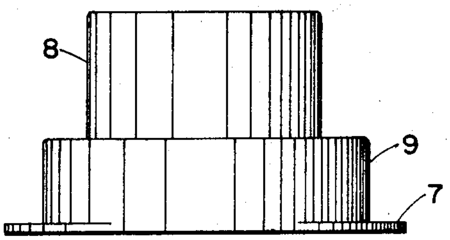
FIG. 1 is a side view of a prior art housing or cup for a telephone housing.
Figure 1A:
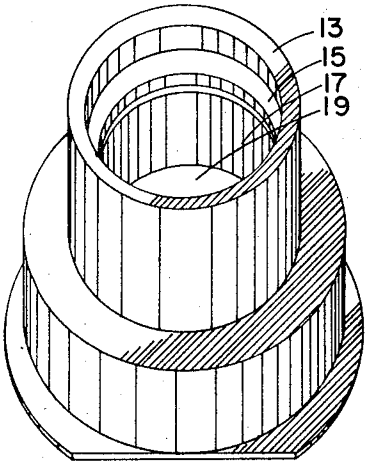
FIG. 1A PRIOR ART
FIG. 1A is a perspective view of the housing of FIG. 1.

Referring to FIG. 1 there is shown a side view and to FIG. 1A an over-all perspective view of a prior art coupler. The prior art coupler comprises an upper portion 8, a lower portion 9, and a base or mounting rim 11. In detail, the prior art device has a top rim for the upper portion 8 that is uniform, the inside wall 13 to the ledge 15 is relatively shallow being in the order of one-fourth inch, and the remainder of the inside wall or to the bottom 19, is uniformly straight up and down. The ledge 15 further comprises an undercut into the wall 17 presumably to give the ledge added resiliency. The relative inside sizes of the upper portion 8 to the bottom portion 9, and the relatively small telephone receiving portion 13 restricts the movement of the coupler when in telephone handset use. The restricted movement does hinder the quick and efficient placing of the telephone on the coupler; and also restricts the movement of the coupler to adjust to normally encountered vibrations.

Figure 6:
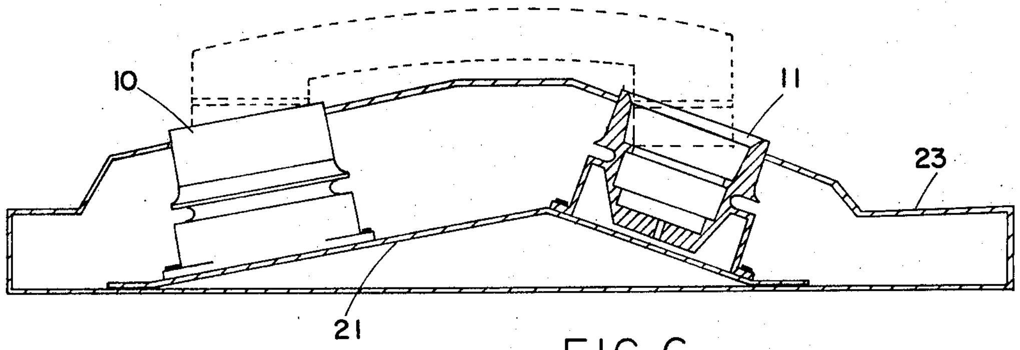
FIG. 6 shows an over-all view of an acoustic coupler — partly cut-away — utilizing the housings of the present invention.

Referring now to FIGS. 2, 3, 4, and 5, there is shown the coupler of the present invention. The over-all coupler for acoustic communication is shown in FIG. 6. The structure — although basically houses the transducer and is adapted to receive the telephone — has many innovations, departures, and improvements over the prior art couplers. Of primary significance and departure from the prior art, is that the over-all structure does not have a resonant frequency of vibration anywhere near the operating frequencies; the structure is more readily adaptable to use with all standard telephones, provides intimate gripping contact, permits and adjusts to normal vibrations and is shock resistant.

More specifically, the thickness or stiffness of the upper portion 12 is substantially greater than that of the lower portion — but yet less than that of the prior art. This in itself permits a greater flexibility and omnidirectional movement of the telephone. To further assist the all directional movement of the upper portion 12 relative to the lower portion 20, there is a severe indentation 18 therebetween. The over-all coupler is a single unitary structure hence the indentation is integrally formed by inner wall 39 between the upper and lower sections. The lowermost part 16 of the upper portion 12 forms a rigid ring for securing and maintaining in position the telephone. The bevel edge 14 prevents cracking at the interface of upper wall 12 with the rigid ring 16.

Figure 2:
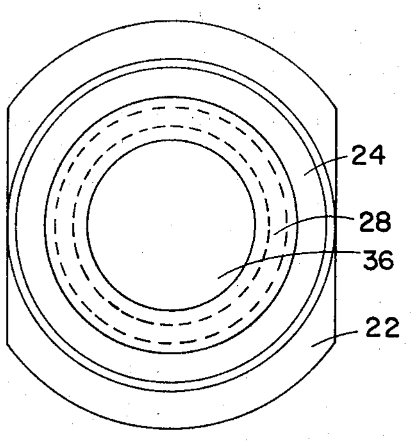
FIG. 2 PRIOR ART
FIG. 2 is a top view of the housing or cup for a telephone in accordance with the present invention.
Figure 3:
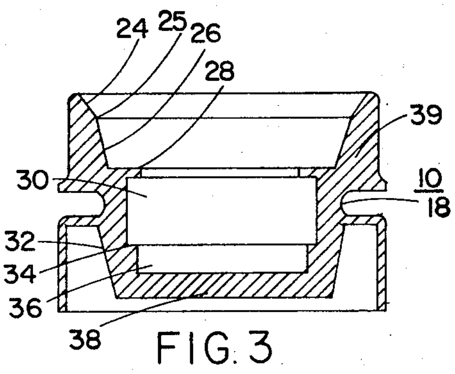
FIG. 3 is a side view of the housing of FIG. 2.
Figure 5:
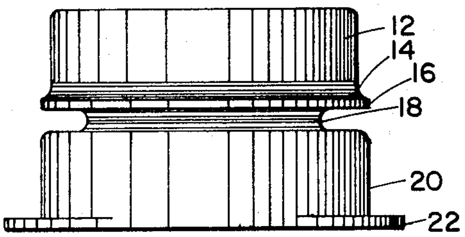
FIG. 5 is a perspective view of the housing of FIG. 3.
Figure 4:
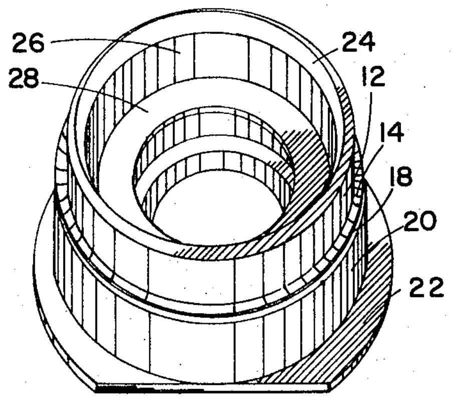
FIG. 4 is a cross sectional view along lines 4—4 of the housing of FIG. 3.

Internally — with particular reference to FIGS. 2, 3, and 4, the uppermost end 24 of the structure is bevelled to more readily receive the telephone. The uppermost edge of the bevelled side 24 forms an opening greater than is needed, it then reduces in opening to a size required to assure a tight fit. It has been found in practice that if the inside diameter of the wall at point 25 — the intersection of bevelled wall 24 and wall 28 — is less than 5 thousandths of an inch greater than the outside diameter of the mouthpiece of the telephone handset, the telephone will be held firmly.

The wall 26 of the coupler extending from the bevelled edge 24 to the ledge 28 is substantially greater in depth than the similar walls of the prior art. Also the wall 26 is not straight up and down but is slanted inwardly. In this way, when the phone is placed into the couplers, the phone headpiece and mouthpiece are automatically gripped and firmly retained. The gripping and retention is further assisted by the resiliency of the rubber-like material. Further, movement of the coupler — if it should occur — will not dislodge the telephone from its seated coupling position. The ledge 28 has an extended width — hence a smaller inside diameter opening — and by over-lapping into the transducer box provides a greater contact area between the coupler and the telephone.

The transducer, as conventionally done, is housed in an opening 30 directly in communication with the telephone handset. Another departure in design, however, is the opening 36 directly below the transducer opening 30. The wall 20 and the mounting ledge 22 are of conventional shape.

In the constructed preferred embodiment the coupler of the present invention was made of molded composition rubber material. The rubber was 30 shore A durometer. The upper portion being substantially thicker than the lower portion to provide the relative flexibility described above.

Referring to FIG. 6 there is shown the over-all design of the acoustic coupler utilizing a mouthpiece housing and an earpiece housing of the present invention. The housings 10 and 11 are fixedly mounted (by a pair of mounting brackets 23) on the support base 21. The support base in turn is permanently positioned in a housing 23. The support base is of complimentary angles relative to a center line. The angle corresponds to the angle of the standard telephone.

Figure 7:
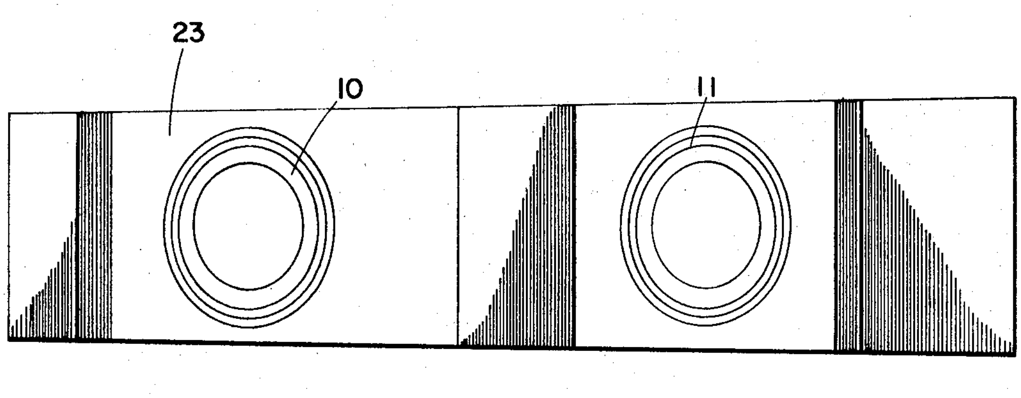
FIG. 7 is a top view of the acoustic coupler of FIG. 6.

FIG. 7 is a top view of the acoustic coupler of FIG. 6 to illustrate the over-all acoustic coupler adapted for data communication systems.

Although certain and specific embodiments have been shown, it is to be understood that modifications may be made without departing from the true spirit and scope of the invention.

What is claimed is:

1. An acoustic coupler for coupling a transducer to a telephone handset for data communication, a pair of shock absorbing means for positioning said telephone handset to said transducer, each means comprising:

a housing having a circular upper portion and a circular lower portion, the diameter of said upper portion being as great as the outside diameter of said lower portion, an opening in said upper portion of a diameter decreasing from a diameter greater than to a diameter less than that of telephone mouth and earpiece to receive and forcibly retain said telephone mouth and earpiece in a shock absorbing acoustical relationship to said transducer, an opening intermediate said lower portion and said upper portion for housing a transducer, means integrally joining together said upper portion and said lower portion, said means including an annular member of a diameter less than the diameter of said upper and lower portions, said annular member turned out at its top to connect to the outside wall of said upper portion and turned out at its bottom to connect to the outside wall of said lower portion, said housing having a highly flexible material makeup and wherein said upper portion and said turned out top part of said annular member has a material thickness greater than said lower portion and said turned out bottom part of said annular member, said openings in said upper portion for receiving said telephone of a diameter greater than the diameter of said annular member, whereby said flexible material, said different thickness flexible material, and said annular joining means provides an omnidirectional and up and down variation in position of said coupler and said telephone handset.

2. The acoustic coupler of claim 1 wherein said opening of decreasing diameter further comprises an upper bevelled edge and said decreasing diameter extends from said bevelled edge to the uppermost part of said lower portion.

3. The acoustic coupler of claim 1 wherein said flexible material is a molded composition rubber having a resonant frequency substantially different than the acoustical.

4. The acoustic coupler of claim 3 wherein said rubber is of a durometer to provide resiliency.

5. The acoustic coupler of claim 1 further comprising a pair of said housings one for the mouthpiece and the other for the earpiece of a telephone, a support member, an enclosure, said support member fixedly supporting said housings in said enclosure in a manner adapted to receive said telephone.

6. The acoustic coupler of claim 5 wherein said enclosure has an upper wall angled to that of said telephone and said support member is similarly angled, said upper wall having a pair of openings to permit said housings to protrude from said enclosure.

* * * * *